United States Patent [19]

Angeloni

[11] Patent Number: 4,632,162
[45] Date of Patent: Dec. 30, 1986

[54] GUIDE ASSEMBLY FOR A MOLDING HEAD

[76] Inventor: Joseph Angeloni, 42 Electric St., Peckville, Pa. 18452

[21] Appl. No.: 779,880

[22] Filed: Sep. 25, 1985

[51] Int. Cl.⁴ ............................................. B27G 13/00
[52] U.S. Cl. ..................................... 144/229; 83/881; 144/253 D
[58] Field of Search ......... 83/881; 144/134 R, 134 A, 144/229, 253 D, 218

[56] References Cited

U.S. PATENT DOCUMENTS

| 1,591,710 | 7/1926 | Joyner | 144/253 D |
| 1,615,893 | 2/1927 | Wagner | 144/253 D |
| 2,728,366 | 12/1955 | Woodell | 144/229 |

FOREIGN PATENT DOCUMENTS 615650  10/1926  France ............................ 144/253 D Primary Examiner—W. D. Bray
Attorney, Agent, or Firm—Kane, Dalsimer, Kane, Sullivan and Kurucz

[57] ABSTRACT

A molding head includes a cutter mounted to a cutting machine arbor. A follower assembly is also mounted on the arbor and is adapted to rotate adjacent to, and independently of, the cutter head. The follower assembly serves to control the depth of cut and to guide the molding cutter along any profile which is desired to be cut.

8 Claims, 4 Drawing Figures

GUIDE ASSEMBLY FOR A MOLDING HEAD

FIELD OF THE INVENTION

The present invention pertains to molding heads and more particularly to an assembly for guiding profile cutting of molding to be used on a radial saw or the like.

BACKGROUND OF THE INVENTION

In wood working and finishing it is often desired to cut an ornamental molding along a pre-cut edge. The molding cut may be made upon a semi-finished wood piece, or upon a strip to be affixed to the wood piece. Tools for straight cutting of a wood molding are well known in the art. U.S. Pat. No. 2,731,991 (Cowley) discloses a basic molding head and cutter. The Cowley patent discloses a conventional cutter head having 3 blades affixed thereto. However, the Cowley patent is limited to cutting straight moldings and does not suggest means for cutting an edge profile.

The need in the art for a system for cutting moldings according to profile has not been met to date. The present invention employs a novel follower means mounted on a bearing assembly to guide the molding head.

In addition, prior art devices have not met the need for a mold cutter with a depth of cut control means.

As can be seen from the above, prior art molding head devices have not addressed the problem of cutting and depth of cut control. In addition, the art of cutting molding is in need of improvements in the areas of speed of cut and safety of cut.

SUMMARY OF THE INVENTION

The primary object of the present invention is to provide a molding head accessory for attachment to a commercially available molding head, which is primarily designed for straight line edge molding. With the molding head attachment of the present invention a commercial molding head is adapted to follow and to edgemold a profile while maintaining the ability to do straight line molding. Examples of applications include cutting a molding along an arched top and/or bottom of a raised panel cabinet door with its respective style pieces and rails.

Another object of the present invention is to provide safer and faster straight line molding by providing support of the workpiece by the follower assembly. Contact of the workpiece against the follower at the cutting circle enables shorter pieces to be edgemolded, reduces vibration, and reduces or eliminates critical fence adjustments or fence usage normally required when edgemolding by the conventional method.

A further object is to provide a practical molding head accessory that will significantly extend the usefulness and provide increased safety in the operation of a commercially available molding head used in conjunction with a radial arm saw or similar type machine.

A still further object of the present invention is to provide uniform depth of cut control of the chosen cutter by selecting an appropriate spacer or disc. The spacer or disc of the present invention may also be used to hold down a workpiece when the machine arbor is in a horizontal position.

To achieve the above objects the present invention provides a molding head for mounting on an arbor member of a machine saw; a cutting means mounted on the arbor member for cutting a molding; a follower assembly mounted on the arbor member having a hub and a follower portion; and a locking means for securing the cutting means and the follower assembly to the arbor member.

Other objects, features and advantages of the invention will be apparent from the following description when read with reference to the accompanying drawings.

The corresponding disc is then mounted to the hub which is then placed on the arbor with the disc portion towards the cutter.

Figure 1:
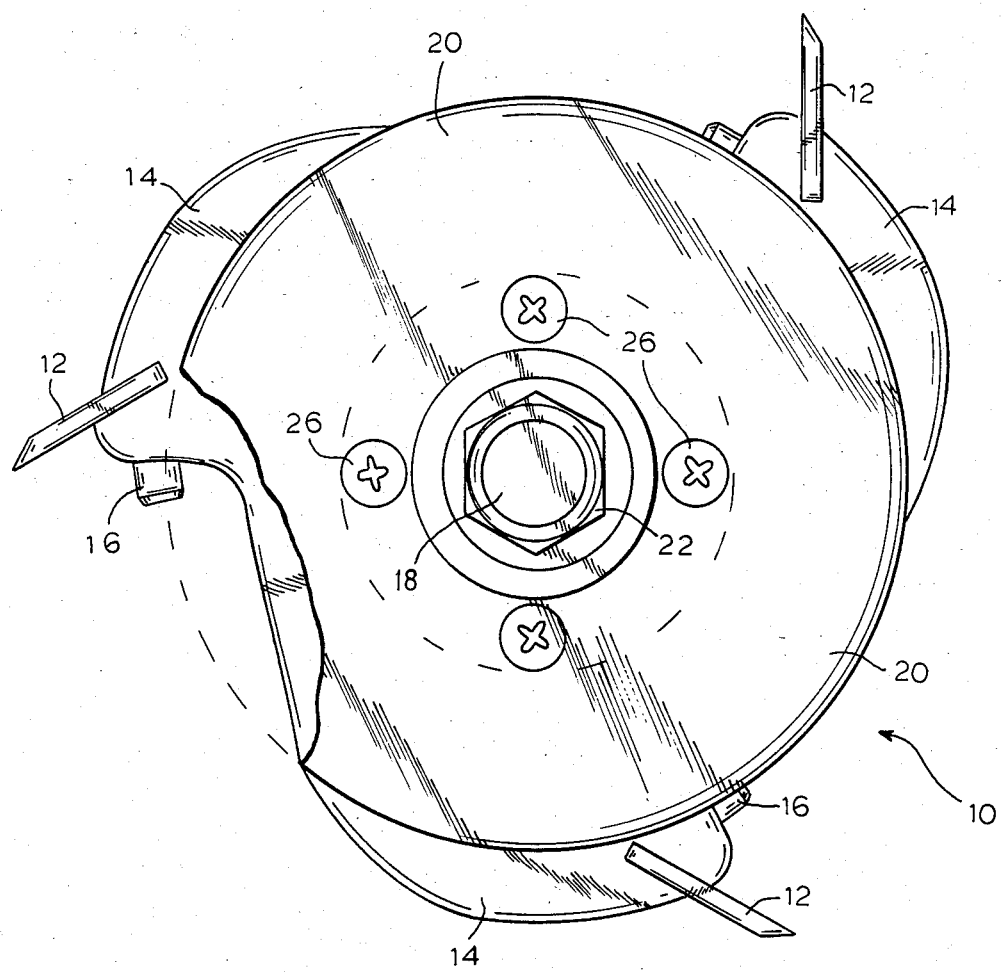
FIG. 1 is a side view of the follower disc and raised panel cutter of the present invention.
Figure 3:
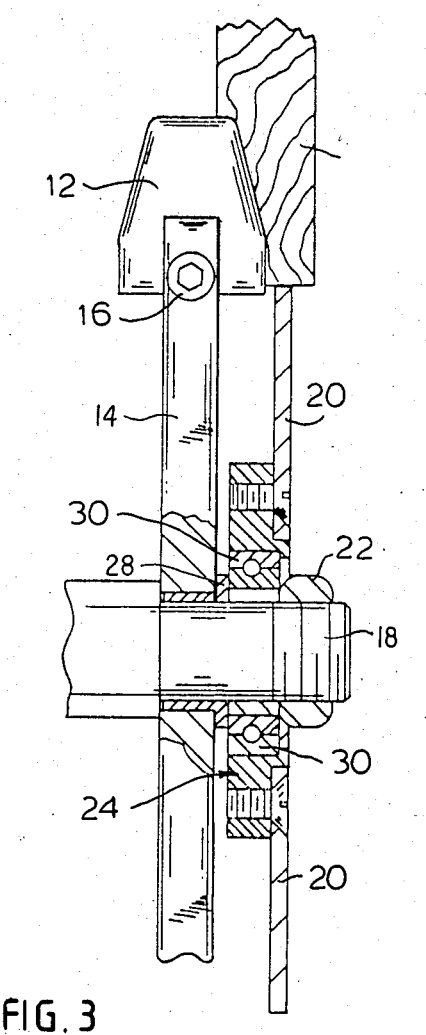

FIG. 3 is a partial sectional view along lines 3—3 of FIG. 1 with a raised panel cutter.

Figure 4:
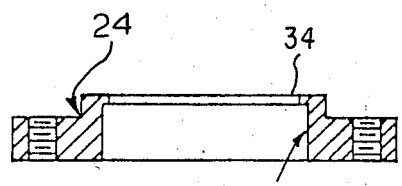

FIG. 4 is a section view of the hub of the present invention.

DETAILED DESCRIPTION OF THE PREFERRED EMBODIMENT

Figure 2:
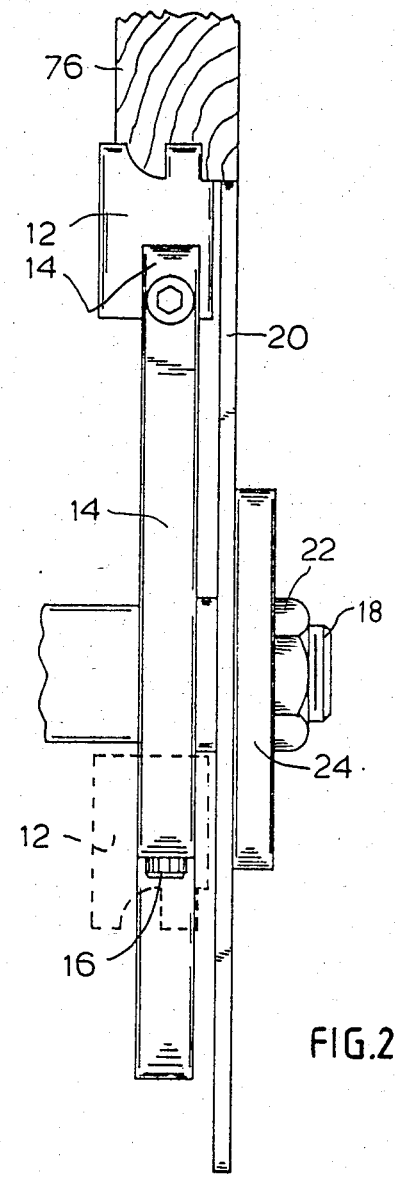
FIG. 2 is a top view of a molding head shown with a style cutter which is frequently used with the raised panel cutter shown in FIG. 3.

FIG. 1 shows a molding head 10 commonly used in cutting a strip of molding. The molding head may be mounted on a horizontally or vertically disposed radial saw arbor. Molding head 10 preferably contains three blades 12 and cutter body 14. Molding head 10 may contain more or less blades as desired. The contour of blade 12 is best illustrated in FIG. 2. The contour of blade 12 is selected in order to cut a strip of molding to the desired shape. A change in molding design is readily accomplished by replacing blades 12 with blades having a different contour. A locking screw 16 is threadingly inserted into cutter body 14 to secure blade 12 into a respective slot in the cutter body. Blades are readily replaced by releasing tension from screws 16, replacing blades 12, then tightening screws 16.

Machine arbor 18 supports the cutter body and is inserted through a central bore therein. The machine arbor may extend in either a horizontal or vertical direction. Follower disc 20 is likewise mounted on arbor 18. The follower disc is secured on the machine arbor by locking nut 22. The dotted line in FIG. 1 represents the circumference of hub 24. Hub 24 is secured to follower disc 20 by screws 26. A shouldered bushing 28, shown in FIG. 2, is located between cutter body 14 and hub 24.

FIG. 3 best illustrates the bearing assembly of the present invention. A bearing containing ball bearings 30 has a bore compatible with arbor 18 and is mounted concentrically within a shoulder 32. The shoulder is located concentrically within hub 24 and is an integral part of the hub.

The disc and hub attachment, depending on cutter or operation, may be located above or below the cutter body when mounted to a vertical axis arbor 18 of a radial or similar type machine.

FIG. 4 is a section view of hub 24 illustrating the contour of the hub. Lip portion 34 extends through follower disc 20 to facilitate mounting of the disk on the hub. Replacement of disc 20 by a disc having a desired diameter dimension serves to control the depth of cut of the molding head. A workpiece 36 is illustrated in FIG. 6. Follower disc 20, by resting on the workpiece and being freely rotatable, enables the molding head to follow the contour of the workpiece and to cut a profile mold. In practice an edge will first be cut by a coping saw, then the molding will be cut by the molding head of the present invention.

Although a detailed description of the present invention has been set forth, it is to be understood that the scope of the present invention is not to be limited thereby, but is to be determined by the claims which follow.

What is claimed is:

1. A molding head and guide means for cutting molding comprising:
   a rotary cutting means comprising a cutter plate having means for removably attaching cutting blades of desired configuration thereto, the cutter plate having an opening in a center portion thereof for mounting on an arbor member of a machine;
   a follower assembly contacting the cutter plate and freely movable with respect thereto, the follower assembly comprising a follower disc and a hub for supporting the follower disc, wherein the hub is coaxial with and parallel to the cutter plate, and comprises a connecting portion for stationary attachment to the follower disc and a mounting means adapted for mounting the hub on an arbor, and wherein the follower disc comprises a plate coaxial with and parallel to the cutter plate having a peripheral edge for following a molding contour, a bearing member, and means for affixing the follower disc to the hub.

2. The molding head and guide means of claim 1 wherein the hub is located between the follower disc and the cutting plate and contains an indented shoulder portion, and wherein the bearing member of the follower disc is disposed within the indented shoulder portion.

3. The molding head and guide means of claim 2 consisting of the cutter plate, the follower disc, the hub, and a shouldered bushing located between the hub and the cutter plate, wherein the cutter plate is a flat, relatively thin plate, the follower disc is a flat, relatively thin disc, and the hub comprises a substantially flat, relatively thin member, thereby adapting the molding head assembly and guide means for use with conventional vertical or horizontal shaft machines.

4. A molding head and guide means according to claim 1 wherein the follower disc is circular and is affixed to the hub and includes a bearing so that when mounted on a machine arbor the follower disc rotates independently of the cutting means.

5. A molding head and guide means according to claim 2 wherein the follower disc is adjacent the cutter so that the follower rests on a molding and determines depth of cut of the cutter.

6. A molding head and guide means according to claim 3 wherein the hub is a detachably affixed to the follower disc by screws to enable ready replacement of the follower disc with another follower disc.

7. A molding head and guide means according to claim 2 further comprising a shouldered bushing mounted between the cutting plate and the hub.

8. A molding head and guide means according to claim 7 wherein the cutting means further comprises three cutting blades.

* * * * *